United States Patent [19]
Perry

[11] Patent Number: 6,051,140
[45] Date of Patent: Apr. 18, 2000

[54] WATER DECONTAMINATING SYSTEM AND METHOD

[76] Inventor: Cliff Perry, 934 S. 295th Pl., Federal Way, Wash. 98003

[21] Appl. No.: 08/984,924

[22] Filed: Dec. 4, 1997

[51] Int. Cl.[7] .................................. C02F 1/50; C02F 9/00
[52] U.S. Cl. .......................... 210/663; 210/669; 210/682; 210/683; 210/686; 210/739; 210/749; 210/753; 210/205
[58] Field of Search ..................................... 210/749, 754, 210/753, 756, 764, 663, 669, 682, 683, 686, 739

[56] References Cited

U.S. PATENT DOCUMENTS

| | | |
|---|---|---|
| 3,257,315 | 6/1966 | Pall . |
| 3,372,808 | 3/1968 | Sabo . |
| 4,019,983 | 4/1977 | Mandt . |
| 4,176,061 | 11/1979 | Stopka . |
| 4,769,154 | 9/1988 | Saylor . |
| 4,804,478 | 2/1989 | Tamir . |
| 5,407,573 | 4/1995 | Hughes . |
| 5,456,831 | 10/1995 | Sullivan . |
| 5,518,613 | 5/1996 | Koczur . |
| 5,552,057 | 9/1996 | Hughes . |
| 5,580,447 | 12/1996 | Porter . |

*Primary Examiner*—Thomas M. Lithgow
*Attorney, Agent, or Firm*—Robert B. Hughes; Hughes & Schact, P.S.

[57] ABSTRACT

A portable point of use water decontaminating unit adapted to receive a flow of water from a faucet or other water source and pass the water through a filtering and decontaminating system to deliver the water as a continuous flow to an outlet. There is a pressure regulator to deliver the water at a proper volumetric flow rate, a pre-disinfectant filter system to receive the water from the pressure regulator and a post disinfectant filter section to filter the disinfectant and contaminants from the water. There is a disinfectant section comprising a disinfectant injector, and an elongate residence tube extending in successive coils around the interior of the container to receive the water from the disinfectant injection means and accomplish disinfection as the water travels through the residence tube.

11 Claims, 5 Drawing Sheets

WATER DECONTAMINATING SYSTEM AND METHOD

BACKGROUND OF THE INVENTION a) Field of the Invention

The present invention relates to a water decontaminating system and apparatus, and also a method related to the same. More particularly, the present invention relates to a point of use water treatment which could be used, for example, at a person's home, for camping, at construction sites, or other situations where on site water purification is needed.

b) Background Art

Where water is supplied in large quantities, such as a water district serving a community, there are in the prior art various systems in place to accomplish the decontamination of the water. However, there are many other instances where "small scale" water decontamination needs to be accomplished. For example, a home may draw its water from its own well, and the water may not meet the required standards. Even if the water does meet the required standards people may wish to decontaminate the water beyond the minimum requirements established by that community. There are other instances, for example, where a person may be away from an established water source, such as camping, or at a work location where the people are not near an established source of clean water.

A search of the patent literature has disclosed a number of concepts for disinfecting water and/or other treatments of water. These are the following:

U.S. Pat. No. 5,419,355 (Brennan et al) shows a system for dissolving a chlorine-containing material such as calcium hypochlorite into water. The water flows through a siphon into a vertical tube containing a dissolvable chlorine compound.

U.S. Pat. No. 4,294,280 (Tom) shows a means for dissolving detergent or the like in a fluid feed system. There is a flap valve 74 that directs water out of the body of detergent 58, and toward the outlet. The valve can be flipped to direct fluid out of the system without picking up any detergent.

U.S. Pat. No. 3,383,178 (Dietz) shows a device for dissolving chlorine carried in tablets contained in the enclosure. The water flows in through the top, around the tablets, and out through an automatic siphon tube, which opens at 18, and includes tube sections 19 and 20. Water enters through the bottom and flows upward until it reaches the height of the siphon and flows out carrying some of the dissolving material.

U.S. Pat. No. 3,370,571 (Knapp) shows a mixing device in which water flows into a container where it mixes with an insecticide.

U.S. Pat. No. 3,260,464 (Walker) shows a chemical mixing system in which fluid flows to a basket of material and picks up some of the material to be dissolved. The fluid then flows to a storage area.

U.S. Pat. No. 3,083,916 (Neel) shows a means for dissolving material insecticide into a flow line.

U.S. Pat. No. 2,600,877 (Jefree) shows a mixing system in which there is an extended tube 21. The input fluid entering through 20 is pulsed and as it moves through pipe 21. Suction draws fluid from a supply chamber such as 42.

U.S. Pat. No. 2,223,747 (Suss) shows a system for dissolving material from crushed oil seed material. The seed flows into the chamber and mixes with the solvent. The solvent/oil mix flows out one exit, the de-oiled seed material out another exit.

U.S. Pat. No. 709,135 (Brown) shows an ore leaching system in which the ore and a fluid such as water or an acid are mixed. The ore/fluid mix travels through sections of pipe that are divided by valves. The valves open and close so that the time the mixed materials are in contact can be controlled.

In spite of various concepts in the prior art to provide water disinfecting/decontaminating systems, there still exists a need for an efficient, cost effective, and convenient means for decontaminating water at the point of use. Further, there is need for such a system where this can be done quickly and yet efficiently, and also where the equipment can be provided in a compact and portable package that can conveniently and promptly set up for operation at the point of use.

It is the object of the present invention to provide such a system and method which has a desirable balance of qualities with regard to the items listed in the above paragraph.

SUMMARY OF THE INVENTION

The present invention provides a water decontaminating system, method, and apparatus which is self-contained and can fit in a relatively small container so as to be portable and conveniently operated at most any point of use. The apparatus can extract water directly from, for example, a water faucet and process the water in a very short time to provide a continuous stream of decontaminated water, or, as a further example, it can be used in conjunction with a small pump which takes the water from a convenient source (e.g. a bucket or tank of water) and moves the water through the decontaminating system.

In the method of the present invention, the water to be decontaminated is taken from a water supply at a volumetric flow rate. This water is directed through a disinfectant section by first directing the water through a disinfectant injector means to add disinfectant throughout the water. This disinfectant has a minimum disinfecting time during which a desired level of disinfection can be accomplished.

The water from the disinfectant injector means is then directed through a retention means by directing the water through an elongate passageway of a residence tube means. The passageway has a travel length through which the water travels during the residence time in the passageway that is dependent on volumetric flow rate through the tube means.

The volumetric flow of the water from the water supply means is matched with the travel length of the passageway so that the residence time of any segment of water passing through the tube means is at least at great as the disinfecting time, thus accomplishing decontamination of the water.

The water from the disinfectant section is directed through a filter section to remove objectionable material from the water after passing through the tube means. In a preferred form, this filter section is a post-disinfectant filter section. Also, in the preferred form, the water is directed to a pre-disinfectant filter section to remove contaminating material prior to the water passing through the disinfectant section. Also, in the preferred form there is a pre-disinfectant filter system which comprises a pre-filter to filter relatively larger particle size contaminating material. Also, the pre-disinfectant section comprises a cysts filter means to remove organic contaminants prior to the water passing through the disinfectant section.

Desirably the water from the supply means is passed through a pressure regulator means to deliver the water at a predetermined pressure level to accomplish the volumetric flow rate of the water to match the travel length of the passageway.

In the preferred form, the post disinfecting filter section comprises a polishing filter which is characterized in that the disinfectant is extracted from the water passing through the polishing filter. In the preferred embodiment, this disinfectant is iodine, and the polishing filter comprises an ion exchange resin and activated carbon.

As an optional feature, the water can be passed through an additional contaminant removal filter to remove particular contaminants that would remain after the water has been disinfected. This additional contaminant removal filter removes a contaminant or contaminants selected from a group consisting of lead, magnesium, tin, nickel, chromium, cadmium, zinc, radium, barium, selenium, fluoride, sodium, nitrates, bicarbonate, chromates, mercury, radioactive material, acidity, and a plurality and/or a combination of any of these.

The tube means has an effective cross sectional flow area having an effective area diameter (d) which is equal to the square root of four times the cross sectional flow area divided by π, and the travel length of the tube means is as least ten times as great as the effective diameter (d) of the tube means. More desirably, the effective area diameter is at least one hundred times as great as the travel length, and more desirably four hundred times as great.

The apparatus of the present invention is desirably provided as a point of use water decontaminating apparatus, comprising a containing housing, a water inlet, a water regulating means, a disinfectant injector means, a resonant tube means, and a water outlet.

Other components and features of the apparatus are as described above.

Other features of the present invention will become apparent from the following detailed description.

DESCRIPTION OF THE PREFERRED EMBODIMENT

The list of harmful contaminates in drinking water supplies is endless, but basically it can be divided into two categories: (a) microbial, and (b) toxlogical. Microbial contaminates lead to diseases such as cholera, typhoid and cryptosporidiosis. When these contaminants are encountered, the time period between cause and effect can be very short. Toxicological contaminants lead to health problems such as lead poisoning and cancer. The cause and effect timeframe for these can be as long as 20 to 30 years.

One of the main advantages of the present invention is that it has the full capability of obtaining a very high level of purification, and can accomplish this in a manner which is particularly convenient for situations where cumbersome and bulky equipment is not practical, where storage facilities for fairly large quantities of pure water is not convenient, and also where the delivery of decontaminated water in a very short period of time is needed.

Figure 1:
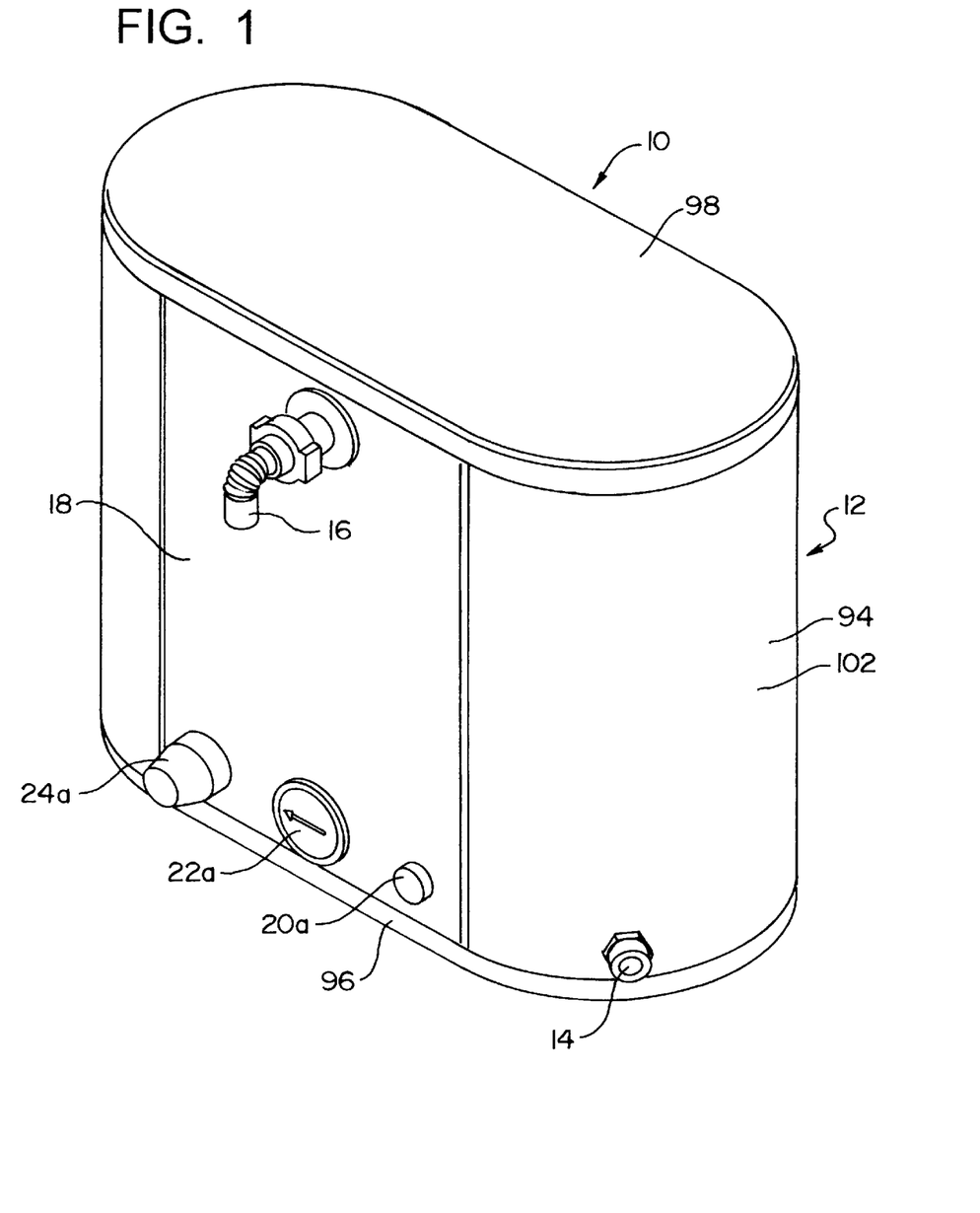
FIG. 1 is an isometric view of the portable unit of the present invention.
Figure 2:
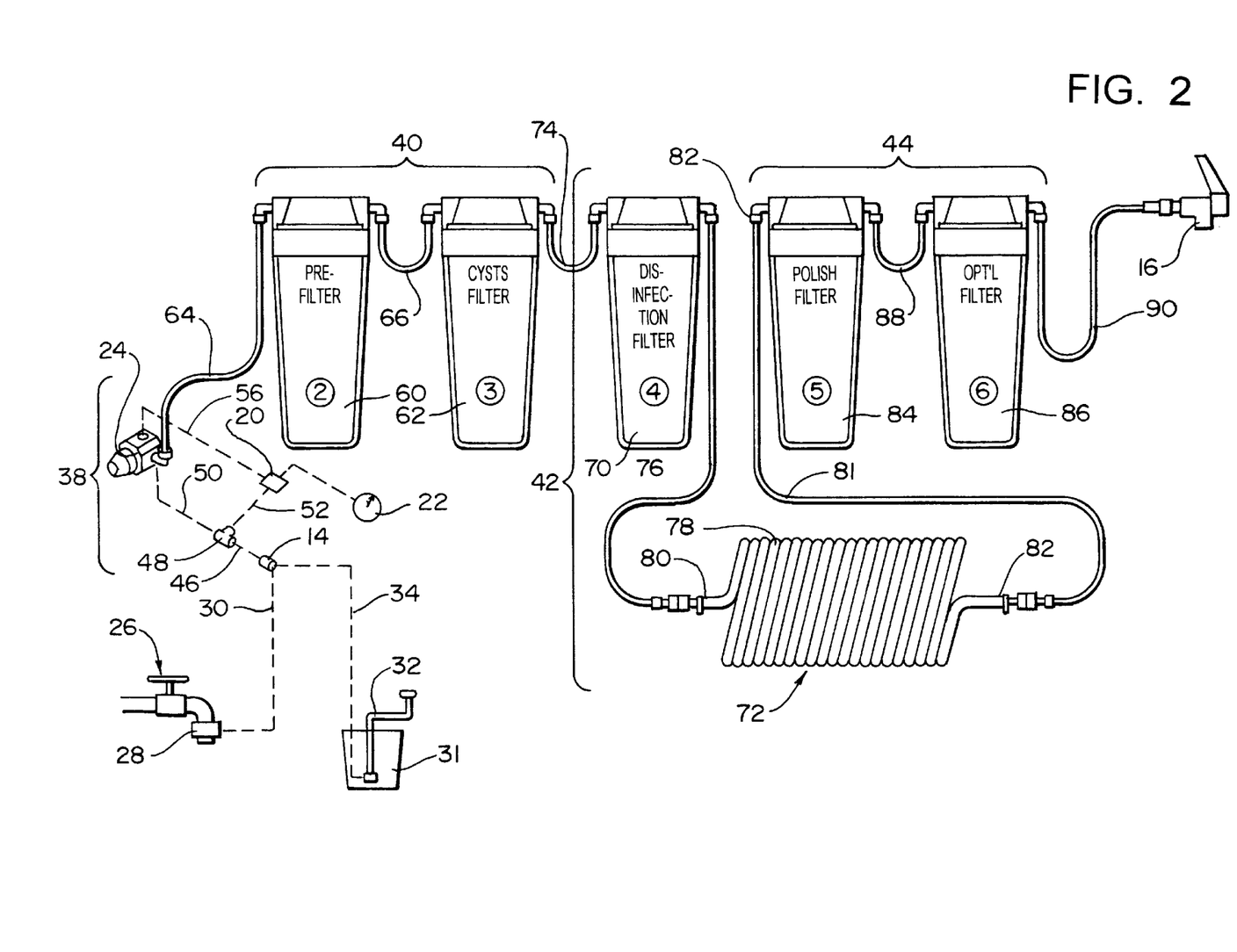
FIG. 2 is a schematic diagram showing the various components of the present invention to demonstrate the sequence of the operation of the present invention.
Figure 3:
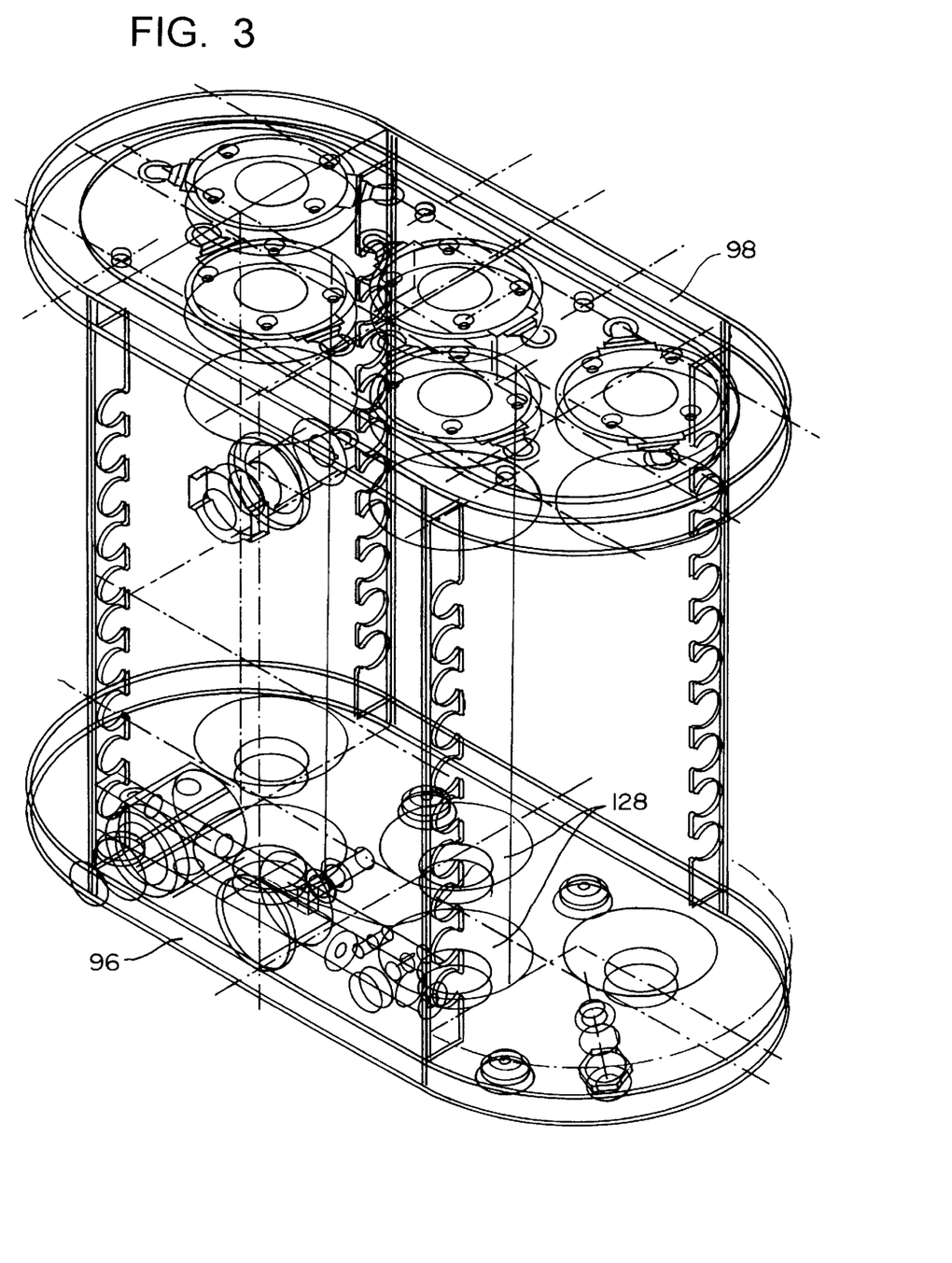
FIG. 3 is an isometric view of the present invention, with portions of the containing wall being removed for purposes of illustration.
Figure 4:
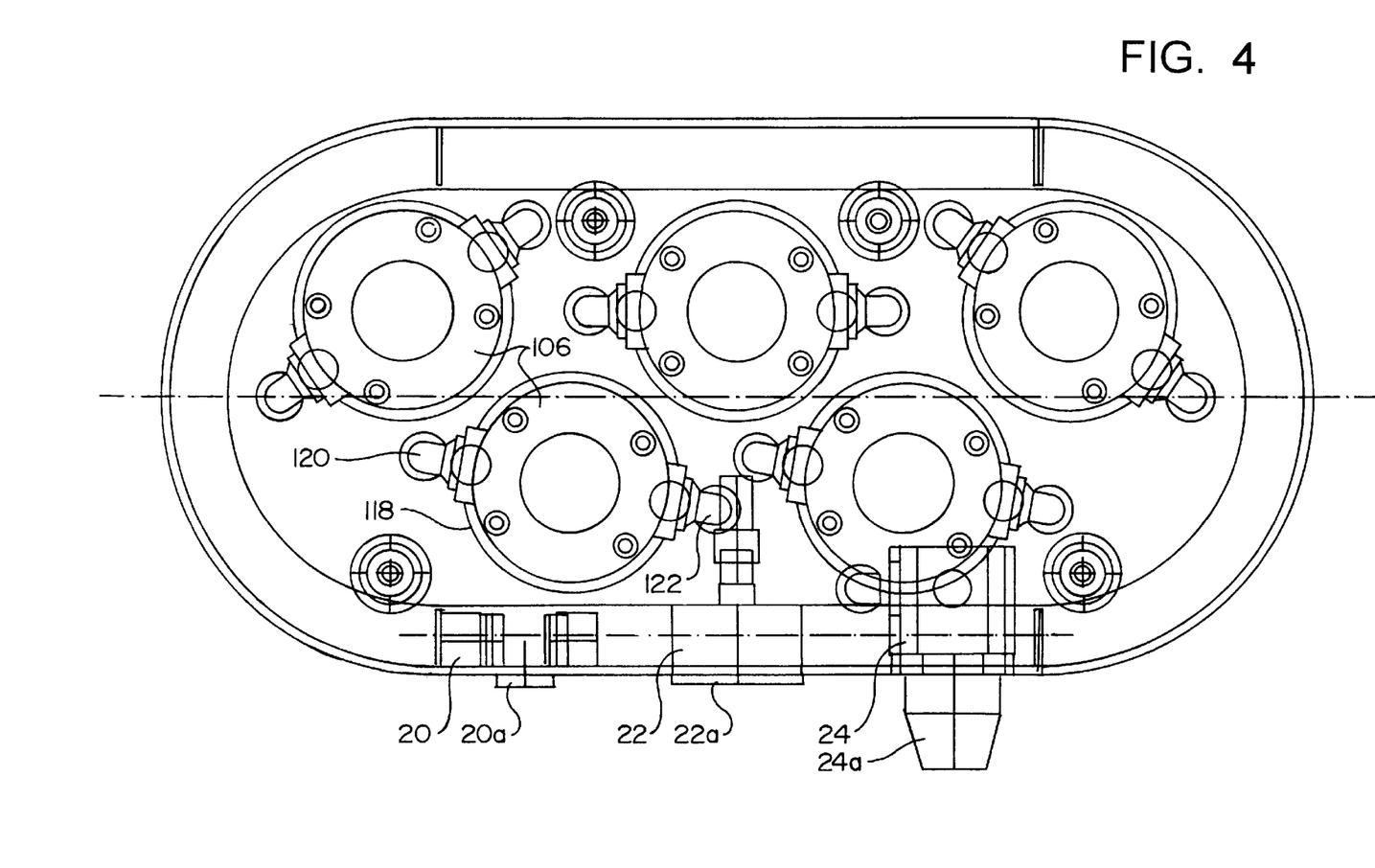
FIG. 4 is a top plan view of the present invention, with the top been removed and to show the components of the present invention.
Figure 5:
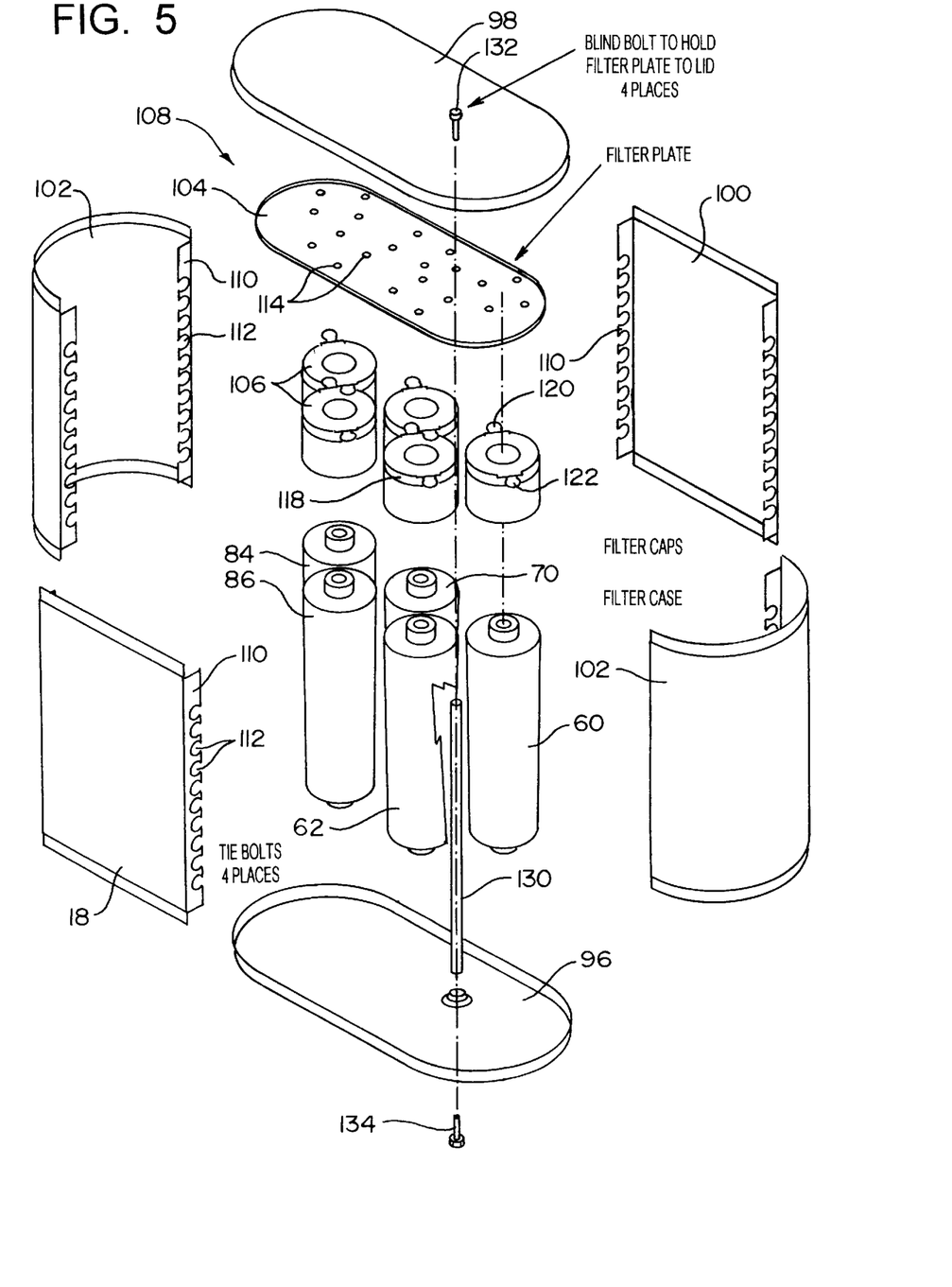
FIG. 5 is an exploded isometric view showing the components of the present invention disassembled from one another.

In the following description, by way of introduction, there will first be a rather brief description of the operation of the present invention in two typical situations for which it is intended. One of these is for home use, taking water directly from a kitchen water faucet, and the other for the use in outdoor camping. Then there will be presented by the following:

i. a description of the overall operation of the present invention with reference to the schematic diagram of FIG. 2;

ii. a more detailed description of the main operating components and their functions;

iii. a more detailed description of the manner in which these components are physically configured, and how these are arranged in a portable unit in accordance with the preferred embodiment of the present invention (a) Introduction With reference to FIG. 1, there is an isometric view of the apparatus or system 10 of the present invention with its operating components positioned in a portable container 12 (e.g. stainless steel or plastic). There is a water inlet connector 14 located at a lower end portion of the container 12 and a water discharge spout 16 centrally located at the top end of a front panel 18 of the container 12. At the lower surface of the front panel 18, there is shown the operating knob 20a of a pressure selector valve 20, a display face 22a of a pressure gauge 22, and an operating knob 24a of an adjustable pressure regulator 24.

As indicated above, one operating mode of the present invention is for home use. To accomplish this, the apparatus 10 (as shown in FIG. 1) is placed a short distance away from the kitchen faucet 26 (shown in the schematic drawing of FIG. 2), which connects to a diverter valve 28. In one position the valve 28 permits the water from the faucet to pass through the diverter valve 28 into the sink. In a second position the valve 28 directs the water through a hose 30 which is connected to the water inlet 14 of the apparatus 10.

If the apparatus 10 has not been previously primed by having water flowing through it (with the water still remaining in the apparatus 10), then as soon as the water faucet is turned on, in about a half a minute or a short time longer, the water flows through the various components of the apparatus 10 and begins to be discharged in a steady stream through the discharge spout 16. On the other hand, if the apparatus 10 has already been in use so that it is primed (i.e. water is already present in the various operating components of the apparatus 10), then the outflow of water will occur almost immediately after the faucet 26 is turned on.

Now let us take a second situation where the apparatus of the present invention is being used at a camping site, where water has been collected in a pail 31 from a nearby source (e.g. a stream that is running close by), and the pail 31 has now been carried back to the campsite. There is provided a small hand pump 32 which directs the water through a hose 34 that in turn is connected to the water inlet 14 of the apparatus 10. Again, the water is purified as it passes through the system and is discharged through the outlet spout 16 as described above.

The tests that have been conducted with the apparatus of the present invention have demonstrated that a very high degree of purification takes place. One prototype of the present invention has been used to demonstrate that the percentage of inactivation of certain bacteria has been many times better than 99.99%.

The apparatus 10 is preset to operate with a predetermined fluid pressure level in the system, which in turn dictates the flow rate through the apparatus. The pressure regulator 24 operates in a manner so that regardless of the pressure at which water enters the inlet 14, the water is delivered into the system at a constant predetermined pressure. The pressure gauge 22 is provided so that this pressure can be checked as needed, and it is arranged so that the pressure both upstream and downstream of the pressure regulator valve 24 can be checked. The selector valve 20 is used to position the pressure gauge 22 so as to be reading either the pressure downstream or upstream of the pressure regulator.

To the best knowledge of the applicants herein, there is not a comparable system, now commercially available, which has the convenient operating features of the present invention, combined with the capability of this level of efficient decontamination of water.

(b) General Description of the System

Reference is again made to FIG. 2, which is a schematic drawing of the system of the present invention.

In terms of function, the apparatus 10 of the present invention can be considered as comprising into four main sections, namely:

i. a water supply and flow regulating section 38;
ii. a pre-disinfectant filter system 40;
iii. a disinfectant section 42, and iv. a final filter section 44.

1. The Flow Inlet And Regulator Section 38

As indicated above, in FIG. 2, there is shown the faucet 26, the diverter valve 28 and hose 30 leading to the inlet connector 14. Also, there is shown the water pail 31, the hand pump 32 and the hose 34, also leading to the inlet connector 14.

This flow inlet and regulator section 38 comprises the inlet connector 14 which leads through a tube 46 to a T connection 48 that has two outlets, one leading through a line 50 directly to the pressure regulator 22, and the other leading through a line 52 to the selector valve 20. The selector valve 20 is a two-way valve (i.e. has two operating positions). In one position the selector valve 20 is set so that the line 52 is connected to the pressure gauge 22 so that the pressure upstream of the regulator 24 is read. It should be understood that the line 52 is a static line, and there is no fluid flow through this line, except for the initial flow into the line 52 to initially direct water to the pressure gauge 22.

In the second position, the valve element of the selector valve 20 is rotated 90° so as to cause the pressure gauge 22 to be in direct communication through the static fluid line 56 with the pressure regulator 24.

The selector valve 20, the pressure gauge 22 and the pressure regulator 24, which are part of this section 38 can all be conventional. As indicated previously the regulator 24 is set so that it receives flow from the line 50 at various pressure levels, but provide an outflow at a constant, predetermined pressure level, depending upon the setting of the pressure regulator 24.

2. The Pre-disinfectant Filter System 40

This pre-disinfectant filter section 40 comprises two main components, namely a pre-filter 60 and a cysts filter 62. These are desirably provided in the form of replaceable cartridges, (e.g. a cartridge from Omnipure 9¼"), as are three other components of the invention which will be described hereinafter (i.e. the disinfectant injector component 70, the polishing filter 84 and the final filter 86).

The prefilter 60 functions in part as a sediment filter and it is or may be of conventional design. The filter media can be made up in part of a more coarse filter material such as a fabric, fiberglass, etc. Also, it may comprise a carbon block having a 10 micron filter rating designed to remove turbidity, suspended solids, certain odor generating ingredients, residual chlorine, and/or organic material. The carbon block could be one such as that supplied by FiberDyne. The estimated capacity in liters of this prefilter 60 is in this particular embodiment about 8,000 liters in terms of performance specifications.

The cysts filter 62 is designed to remove certain organisms such as cryptospordium, giardia, and guineaworm. This filter can comprise a ceramic filter element with 0.4 micron rating. As indicated above, this also is desirably a replaceable filter cartridge. The ceramic filter material can be a material such as that supplied by Water Protection.

In operation, the water passes from the regulator 24 of the inlet and regulator section 38 through a line 64 to flow into the upper end of the prefilter component 60. The water passes through the filter media in the filter component 60 and passes outwardly therefrom through a line 66 into the upper end of the cysts filter 62. As indicated above, both of these filter components 60 and 62 are, or may be, conventional, and the flow pattern of the water through these filter components can be accomplished in conventional ways, such as being delivered from the inlet through a central pipe to an opposite end of the filter, with the water thence traveling through the annular filter passageway which contains the filter material and surrounds the feed pipe, back up to the end of the filter component into which the water is initially delivered.

The water, after passing through these two filter components 60 and 62, has been decontaminated to some extent, but certain bacteria and/or viruses may still be present. Accordingly, the water which has passed through the two filter components 60 and 62 of the pre-disinfecting section 40 is now directed into the disinfecting section 42.

3. Disinfecting Section 42

This disinfecting section 42 comprises two main components, namely:

i. a disinfectant injector component 70, and
ii. a retention component 72.

The disinfectant injector component 70 can have substantially the same overall configuration as the two filter components 60 and 62 of the section 40. This disinfector injector 70 is in some instances referred to as a "filter", which is a misnomer, since it does not actually perform a filtering function.

The media in this disinfectant injector component 70 is an iodine containing resin, and this specific material can be an "MCV resin". This is a polyiodinated ion exchange resin that slowly releases iodine into the water which passes through this resin. This component 70 is, or may be, of a basic conventional design where the resin/iodine material is positioned in a cartridge. The MCV resin could be a material such as that supplied by Umpqua Research.

In operation, the water from the cysts filter component 62 travels through a line 74 into the disinfectant injector component 70 so that the water passes through the resin/iodine material. The flow rate of the water is matched to the capacity of the component 70, so that an adequate amount of iodine is dissolved in the water. The water from the resin/iodine component 70 flows through a line 76 to the aforementioned retention component 72.

This retention component 72 comprises an elongate tube 78, which in this preferred embodiment is approximately 22 feet long and has an inside diameter of ½ inch. The inlet end 80 of this tube 78 is connected to the outlet tube 76 from the disinfectant injector component 70, and the water flows through this tube 78 to its outlet end at 82.

The function of this tube is as follows. In order for the iodine that is dissolved in the water to operate effectively in deactivating the remaining organisms in the water, every portion of the water should have a minimum concentration of iodine in it. Further, there is a minimum time period, which can be termed a "dwell time" or a "residence time" during which the organisms in the water (i.e. bacteria and/or viruses) must be exposed to the iodine in the water to be inactivated. It has been found that these goals have been effectively and very conveniently achieved by this unique component 72, and with this arrangement, there is an exceptionally high percentage of "kill" of the objectionable organisms.

While the phenomena of fluid flow involving the proper dispersion of the iodine in the water can have its complexities, with a number of variables, it is believed that the following hypotheses can be presented with a reasonable degree of justification as at least a partial explanation for the improved results.

The inside diameter (about one half inch) of the tube 78 is sufficiently small relative to the approximate velocity of the flow through the tube 78 (about one and one half feet per second) that the Reynolds number is sufficiently high so that the flow through the tube 78 is turbulent. Thus, as the water is traveling through the tube 78 there is a constant mixing action. In general, with this turbulent flow, it can be assumed that on the average each "particle" of water will have a lateral path of travel which would be equal to ten percent of the velocity of the linear path of travel along the pipe or conduit. Thus, with the tube 78 being twenty two feet long and having only one half inch interior diameter, we can expect a substantial amount of mixing as the water travels through the tube 78.

At the same time, when the water is constrained to move along the elongate tube of uniform cross section, it can be surmised that while there is a turbulent and random lateral motion of the water in terms of eddy current flows, etc. Any given segment or "plug" of the water, while mixing with portion of the water immediately forwardly and rearwardly thereof, would still maintain a fair degree of identity so that this particular "segment" or "plug" would be at a velocity so as to have adequate residence time in the tube 78 to be within the disinfecting time period. The overall effect of this is that the length of the tubing 78 relative to the flow thereto is sufficiently great so that substantially every segment of water passing through the tube 78 has sufficient dwell time to obtain adequate disinfecting action.

Thus, in accordance with the above hypothesis, it is surmised that substantially all portions of the water flowing from the disinfector injector component 70 to the next postdisinfectant section 44 have at least a minimum "dwell time" or "residence time" which enables the disinfecting in the water to take place, and also the manner of moving the water is such that potential "dead spots" (i.e. where a small quantity of water remains isolated from mixing as it flows down the tube 78) in the water are substantially completely eliminated so that substantially every small portion of the water has an adequate concentration of iodine so as to have the proper disinfecting effect.

Also, the particular arrangement of the tube 78 in the apparatus of the present invention, relative to the other components, is felt to be rather unique in this particular application, and this will be described later herein.

4. Post Disinfecting Section 44

There are two main components to this post disinfecting section 44, namely:

i. a polishing filter component 84;

ii. a final filter 86 (which is usually desirable, yet optional).

The filter material for the polishing filter component 84 comprises an anion exchange resin activated carbon, such as the one supplied by Umpqua Research as an "anion resin". Since iodine in the water does not have a desirable taste for drinking, this filter material is designed to remove iodin ($I_2$) and reduces the concentration of the iodine ion ($I^-$). this polishing stage also removes other trace contaminants that might contribute to a bad taste in the water.

As indicated above, the final filter 86 is optional and could desirably be used to provide a filter material or a several filter materials which are capable of removing contaminants that might be present in the water being treated.

To accomplish this, the water to be treated would first be analyzed to identify the particular contaminants that are present in sufficient quantity which would indicate that further water treatment would be necessary. For example, lead may be present or other heavy metals such as magnesium, tin, nickel, chromium, cadmium, zinc, radium, barium and/or selenium. Fluoride could also be present in undesired quantities. The removal of sodium may be needed, particularly for people on low sodium diets. Among the other possible contaminates are nitrates, bicarbonates, chromates, mercury, radioactive material, and/or acid well water.

In operation, the water passes from the tube 78 through a line 81 into the inlet 82, and thence through the polishing filter 84. Water from the polishing filter travels through the tube 88 and then to the final filter component 86 to be discharged through the line 90 and thence to the spigot 16.

As indicated above, in the preferred embodiment, the filter components 60, 62, 84, 86 and also the disinfectant injector 70 comprise a standard cannister, shaped as a moderately tapered cylinder, with the filter components being provided in the form of a cartridge inserted in the cannister. Such cannisters are provided by "Omnipure". The overall length of this cannister of this embodiment is about twelve inches, including the mounting head to be described hereinafter, and the cartridge itself, also provided by "Omnipure", is 9 and ¼ inches in length.

The filter components 60, 62, 84 and 86 and also the disinfectant injector component 70 are matched so that the capacities of these components, in terms of their useful life, measured in terms of total quantity flow, are approximately the same. Also, desirably the capacity of each component is such to enable each to process 8,000 liters of water before replacement is needed. (Of course, these should be inspected periodically to see replacement is needed).

5. Configuration of the Apparatus 10

As indicated previously, one of the desirable features of the present invention is the manner in which the entire system can be incorporated as a portable, self-contained, point-of-use unit 10.

With reference to FIGS. 1, 3, 4, and 5, the container 12 comprises a main housing 94, a base cover 96 and a lid 98. The main housing 94 comprises the aforementioned front panel 18, a back panel 100, and two end sections 102, each of which has in horizontal cross section, a semicircular configuration, with the end edges attaching to the front and rear panels 18 and 100. (See FIG. 5). There is a top mounting plate 104 connected to the bottom side of the lid 98 so as to be immediately adjacent thereto. Five end caps 106 are connected to the lower side of plate 104, and each end cap 106 is connected to the top end of the related one of the cannisters of the components 60, 62, 70, 84 and 86. The lid 98, mounting plate 104 and end caps 106 comprise a top mounting structure 108 to perform the function of positioning and securing the four filter components 60, 62, 84 and 86 and the disinfectant injector component 70 within the container 12.

To mount the aforementioned tube 78 of the disinfectant injector component 70, there is provided a plurality of vertically aligned mounting brackets 110, two brackets positioned at opposite edges of the front panel 18, and the other two at opposite side edges of the back panel 100. These brackets 110 are formed integrally with the front and back panels 18 and 100, and each bracket 110 has a plurality of vertically spaced circular cutouts 112. Also matching brackets 110, with cutouts 112 are made integral with the two edges of each end section 102, and each of these matching brackets are welded or otherwise connected to an adjacent bracket 110 of the front and rear panels 18 and 100, as a means of connecting the panels 18 and 100 to the end sections 102.

The tube 78 is mounted in these cutouts 110 in what can be described as a "flattened coil" configuration where the tube extends around the entire inner side surface of the container 12, so as to be positioned in a first 360° path in the lowermost set of cutouts, and then in a second circumferential path through the next upwardly positioned set of cutouts 112, until the entire tube 78 is completely positioned, so as to be mounted within the brackets 110 in the cutouts 112 around a substantial portion of the inner surface of the container 12.

The aforementioned selector valve 20, pressure gauge 22 and pressure regulator 24 are positioned inside the container 12 adjacent to the base plate 96 and also adjacent to the lower inside surface portion of the front panel 18. The aforementioned operating knobs 20a and 24a of the selector valve 20 and the pressure regulator 24, respectively, are positioned outside of the front panel 18, and the display face 22a of the pressure gauge 24 is positioned at an opening in the bottom middle portion of the front panel 18 so as to be properly displayed. The lowermost set of cutouts 112 is positioned at a level just above the selector valve 20, pressure gauge 22 and pressure regulator 24.

The five caps 106 are connected to the mounting plate 104 by screws inserted through the screw holes 114 and into matching screw holes in the caps 106. Each cap 106 has a circumferential downwardly extending rim 118 which is interiorly threaded to engage the upper end of a related canister of the operating components 60, 62, 70, 84 and 86. Also each cap 106 has an inlet connector and an outlet connector 120 and 122, respectively, are mounted to the perimeter of each cap 106 180° apart.

The base plate 96 may be formed with five concave recesses 128 (see FIG. 3), each of which is vertically aligned with a related inlet and outlet cap 116, with each recess 128 being arranged to receive and locate the lower end of a related canister of the operating components 60, 62, 70, 84 and 86.

In the particular arrangement of this preferred embodiment, the caps 106 and their related recesses 128 are arranged in two longitudinally extending rows, with three in one row, and two in the other row, and with the longitudinal spacing of the sets of caps 106 and recesses 128 staggered with one another in what might be described as a "W" configuration, for best utilization of the space within the container 12.

The top mounting structure 108 and the base plate 106 are interconnected by four tie rods, one of which is shown at 130 (see FIG. 5), which extend from the upper mounting plate 104 downwardly to the base plate 96. The open ends of each tie rod 130 are interiorly threaded to receive one of four upper bolts 132 that are attached to the lid 98 and extend through the plate 104, and by four lower bolts 134 that extend through the base plate 96 and are threaded into the lower ends of the rods 130.

As indicated previously, the five operating components 60, 62, 70, 84 and 86 are all provided in the form of replaceable cartridges (or cannisters). Since the basic instruction of this cartridge 140 is the same for all five components 60, 62, 70, 84 and 86, this description will apply to all five of those components.

Each cartridge comprises the outer containing portion and there is a center tube extending downwardly to terminate a short distance above the bottom wall of the containing member. The tube defines with the outer containing member side wall an annular chamber in which the filter material (or the ion exchange resin in the case of the component 70) is contained.

The cap 106 is formed with an inlet passageway which leads from the inlet 120 to the upper end of the central tube. The cap 106 also defines an upper chamber which receives the flow of water that is passed upwardly through the annular chamber, and this connects to the discharge fitting 122. As indicated previously, each of these cartridges are preassembled at the manufacturing location and all that is necessary is for the end user of the apparatus 10 to remove the spent cartridge 140 from the apparatus 10 and send that to a source for recycling or other disposal and then insert the fresh cartridge.

To replace any of the five operating components 60, 62, 70, 84 and 86, the lower bolts 134 are removed and the base plate 96 removed. Then the top end of the canister of each operating component is unthreaded from its related cap 116, and a new canister inserted. Then the base plate 96 is placed back in its position at the lower part of the container 12 and secured thereto by means of the tie rods 130, along with the upper and lower bolts 132 and 134. Thus there is no need to disconnect any of the lines to replace any of the operating components 60, 62, 70, 84 and 86.

D. The Assembling and Operation of the Present Invention

The container 12 is assembled by welding the front and rear panels 18 and 100 to the end sections 102. Then, the tube 78 of the retention component 72 is inserted within the internal circumference of the main housing 94 by placing the tube 78 in the bracket openings or cutouts 112 so that the tube extends circumferentially in a flattened coil "stacked" configuration around the greater part of the inner surface of the main housing 94.

The caps 106 are connected to the mounting plate 104 by inserting the screws through the plate 104 and screwing these into the caps 106. The plate 104 against the lid with the bolts 132 extending through the plate 104. Then the mounting plate 104 is placed in the upper part of the main housing 94, just above the brackets 100. Then the water line connections are made with the caps 106, by inserting and connecting the water lines 66, 74, 76, 81, 88 and 90 and the other water line connections are made. The lid is placed onto the main housing 94, and the upper ends of the tie rods are then threaded onto the upper bolts 132 to hold the lid 98 and the plate 104 together.

After this the five operating components 60, 62, 70, 84 and 86 are put into place by threading the upper part of the canister of each of these components into the rim 118 of its related cap 106. Each of these components and its related cap 106 is arranged so that the inlet and outlet fittings 120 and 122 provide the proper flow paths of the water into the canister of each component and through the filter media (and also the ion exchange resin in the disinfecting injector) and out through the outlet fitting 122. Then the selector valve 20, the pressure gauge 22 and the pressure regulator 24 are installed, and the base lid is placed on the bottom of the main housing 94 and bolted to the tie rods 130.

With the apparatus 10 assembled, the pressure regulator 24 is set to accomplish the proper flow rate of water through the system. In the specific embodiment of the present invention described herein, with the tube 78 being twenty two feet long and having a half an inch inside diameter, in order for the apparatus 10 to operate with an output of one half gallon per minute, the flow rate of water through the twenty two foot tube would be at approximately one and one half feet per second. Thus, each portion of water which is leaving the disinfectant injector component 70 will have a total residence time in the tube 78 (from the time it enters the tube 78 until it leaves the tube 78) of at least approximately fifteen seconds, which has been found to be quite adequate to accomplish a very high level of effectiveness in disinfecting the water.

As indicated above, the desired flow rate through the apparatus 10 is accomplished by adjusting the setting of the pressure regulator 24, to in turn control pressure level of the water leaving the pressure regulator 24, relative to the resistance to flow provided by the various components of the apparatus 10, to obtain the proper flow rate. The particular design of the four filter components 60, 62, 84 and 86, the disinfectant injector component 70, and retention section 72 of this particular embodiment is such that a water pressure of about 15 psi leaving the pressure regulator has been found the proper level to accomplish a desired flow rate of 0.5 gallons per minute. Each of the four filter components 60, 62, 84 and 86 are able to function quite adequately at these flow rates and with this inlet pressure. This flow rate also provides sufficient residence time of the water passing through the disinfectant injector component 70 to dissolve an adequate concentration of iodine in the water; and this provides a dwell time (15 seconds) for the water with the iodine dissolved therein to travel through the tube 78 before it passes through the last two filter components 84 and 86.

However, it may be that with replacing certain components after a period of use, there may be some difference in the flow resistance of certain filters. In this instance, the pressure regulator 24 can be adjusted to compensate for this. This could be accomplished by measuring the amount of water which flows through the system during a given period of time and then making the adjustment in the pressure regulator 24 accordingly.

With the apparatus 10 being properly assembled and with the pressure regulator 24 properly set, the apparatus 10 is now ready for use. The water inlet connector 14 is connected to the selected water source. The pressure of the water delivered into the apparatus 10 should be at a pressure level at least as high as the pressure level at which the regulator 24 is set. If the water pressure is higher than that desired for the system, then the pressure regulator 24 passes the water through at the lower pressure level for which it is set to obtain the proper flow rate.

As described previously, the water flows from the inlet 14 through the appropriate tube connections through first the prefilter 60, then through the cysts filter 62, and thence into the disinfecting injector component 70. The iodine in the resin/iodine material dissolves into the water, and the water discharge from the component 70 then begins its path of travel through the tube 78 of the residence section 72. As indicated previously herein, it has been found that with this particular arrangement of the tube 78 providing the flow path for the water, there is an adequate time period for the iodine to act on the bacteria, viruses or other organic contaminates in the water, and the dispersion of the dissolved iodine is sufficiently uniform throughout the water, so that a very high level of disinfecting takes place.

The water exiting from the tube 78 then flows through the final two filter components 84 and 86 to exit from the spigot 16.

The operation of the apparatus 10 is terminated simply by shutting off the flow of water from the water source. The water that remains in the apparatus 10 can do so for an indefinite period of time. The disinfectant injector component 70 is such that when the amount of iodine in the water in the component 70 has reached a certain level, an equilibrium condition is reached, with the quantity of iodine in the water increasing no further. Also, the water which remains in the residence section 72 (i.e. within the tube 78) simply remains in the tube 78. Then at a later time when the apparatus 10 is again put into use, the water within the disinfecting injector component 70 and in the residence section 72 simply passes through the final two filter components 84 and 86 to be discharged.

It is to be recognized that various modifications can be made without departing from the basic teachings of the present invention.

Wherefore I claim:

1. A method of decontaminating water from a source to provide potable water comprising:
   a. providing water to be decontaminated from a water supply at a volumetric flow rate;
   b. directing the water through a disinfecting section by:
      i. directing the water through a polyiodinate resin to add iodine disinfectant throughout said water, the iodine disinfectant added to the water having a minimum disinfecting time during which a desired level of disinfection can be accomplished;
      ii. directing the water from the disinfectant section through a retention means by directing the water through an elongate residence tube, said tube having a travel length through which the water travels during a residence time in the tube that is dependent on volumetric flow rate through the tube;
   c. said process further comprising matching the volumetric flow rate of the water from the water supply with the travel length of the tube so that a residence time of any segment water passing through the tube is at least as great as the disinfecting time, to accomplish decontamination of the water;
   d. directing the water through a predisinfectant filter section prior to the disinfecting section, wherein said predisinfectant filter section comprises a cyst filter to remove cysts from the water prior to the water passing through the disinfecting section, and directing the water through a post disinfection filter section to remove objectionable material from the water after passing through the tube;
   e. the water in said process being entirely directed through said injection, said tube and said filter section which are all in series so that potable water is produced.

2. The method as recited in claim 1, wherein said predisinfectant filter section comprises a pre-filter to filter relatively larger particle size contaminating material.

3. The method as recited in claim 1, wherein said water from the supply means is passed through a pressure regulator to deliver water at a predetermined pressure level to accomplish the volumetric flow rate of the water to match with the travel length of the passageway.

4. The method as recited in claim 1, wherein said filter comprises a polishing filter which is characterized in that the disinfectant is extracted from the water passing through the polishing filter.

5. The method as recited in claim 4, wherein said disinfectant is iodine.

6. The method as recited in claim 5, wherein said polishing filter comprises an anion exchange resin and activated carbon.

7. The method as recited in claim 4, wherein said water is also selectively passed through an additional contaminant removal filter, said method further comprising selecting a desired filter component or components to remove particular contaminants that would remain after the water has been disinfected.

8. The method as recited in claim 7, wherein the additional contaminant removal filter removes a contaminant or contaminants selected from a group consisting of lead, magnesium, tin, nickel, chromium, cadmium, zinc, radium, barium, selenium, fluoride, sodium, nitrates, bicarbonate, chromates, mercury, radio active material, acidity, and a plurality and/or a combination of any of these.

9. The method as recited in claim 1, wherein said tube means has an effective cross sectional flow area having an effective area diameter (d) which is equal to the square root of the quantity of four times the area divided by $\pi$, and the travel length of the tube means is at least ten times as great as the effective area diameter (d) of the tube means.

10. The method as recited in claim 9, wherein said travel length is at least one hundred times as great as said effective diameter.

11. The method as recited in claim 9, wherein said travel length is at least four hundred times as great as said effective diameter.

* * * * *